Patented May 20, 1930

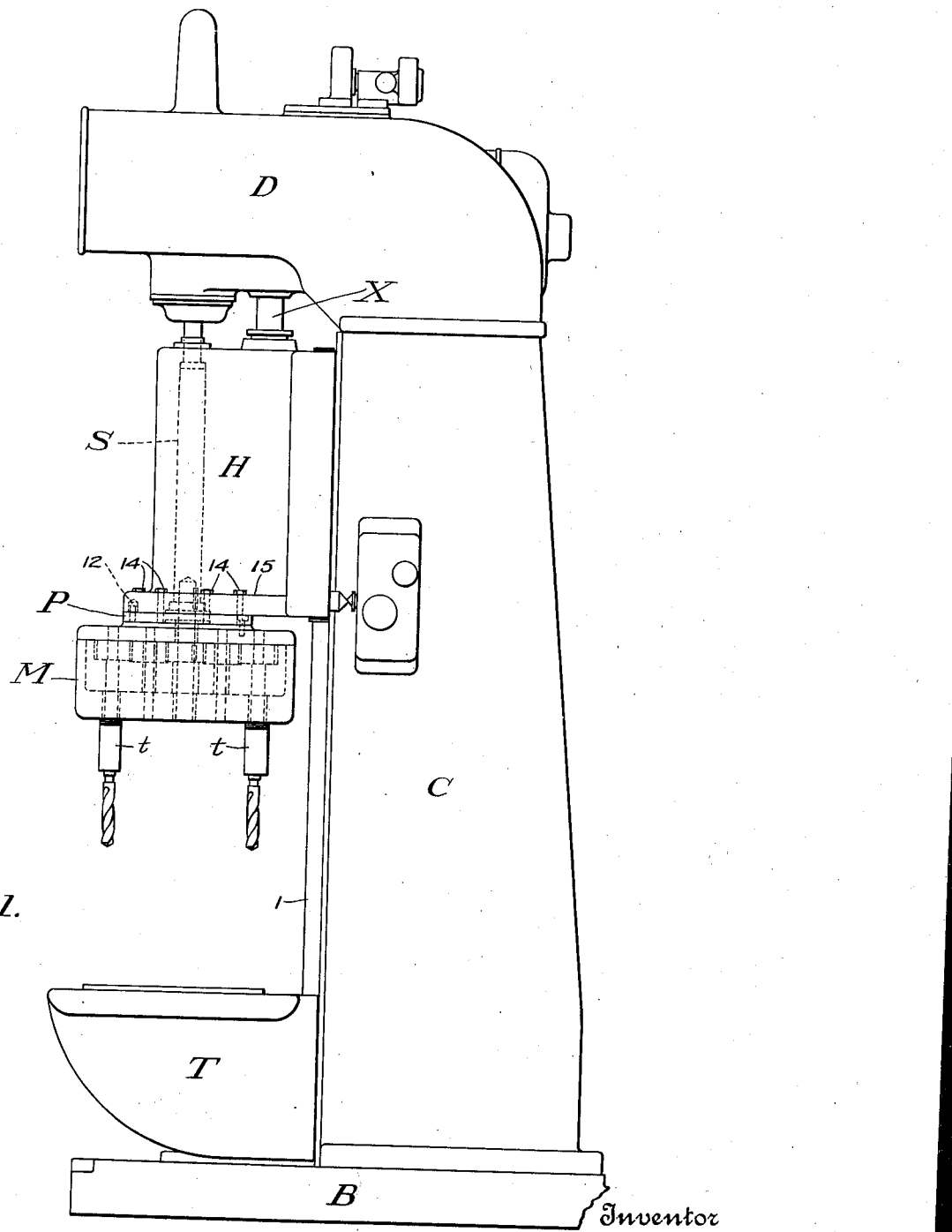

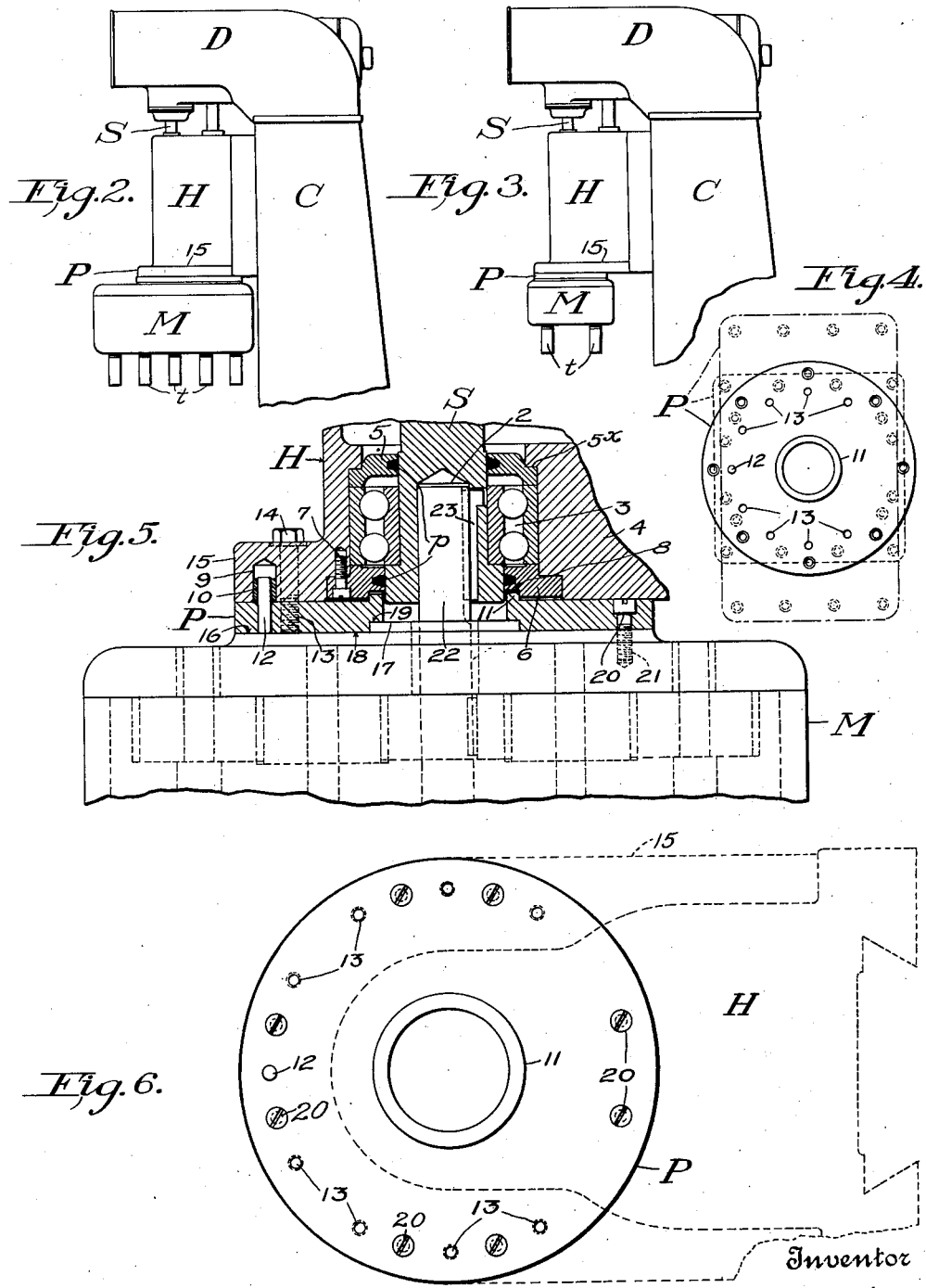

1,759,388

UNITED STATES PATENT OFFICE

HARRY W. BOCKHOFF, OF RICHMOND, INDIANA, ASSIGNOR TO THE NATIONAL AUTOMATIC TOOL COMPANY, OF RICHMOND, INDIANA, A CORPORATION OF INDIANA

DRILL-HEAD ADAPTER PLATE

Application filed February 15, 1928. Serial No. 254,366.

This invention deals with machine tools and it relates more particularly to metal drilling machines of that type in which there is provided a translatable tool-head carrying one or more rotating spindles.

It is generally recognized that "single purpose" machine tools (i. e. machine tools built to perform but a single operation on identical work pieces) are most efficient and most desirable, and wherever parts are produced in sufficiently large numbers to warrant the purchase and insure substantially constant use of such machines, they are usually employed. "Universal" or "multi-purpose" machines (i. e. machines which, by suitable changes, adjustments, re-arrangement of parts, etc. may be employed to perform operations of various kinds or similar operations in various ways) also have their advantages and are frequently provided and used in shops and factories where the number of identical operations to be performed, or similar parts to be produced, are not sufficiently great to warrant the purchase of a "single-purpose" machine. When the "universal" machine is provided the machine may (after desired number of operations of one type has been performed) be re-arranged or re-set to enable it to be used for other and different operations for which previously it was not adapted; thus a machine of this latter type may be kept in substantially constant use even though the number of identical operations to be performed be not great.

Although these "universal" machines are useful and may be employed to advantage for certain purposes, nevertheless the fact remains that they are not highly efficient, in that they necessarily are provided with many parts which are not required for a large percentage of the operations performed; and which, though not always in use, are usually driven continuously. Machines of this type therefore are costly both to purchase and to operate. Furthermore the repeated re-adjustment and re-arrangement of the parts consumes considerable time, is bothersome to the operator, and, due to the fact that operators are only human and therefore not infallible, occasionally results in errors which reduce or destroy the accuracy and precision desired in the finished product.

This invention has for an object to render available means in the form of an improved adapter plate whereby any one of a plurality of differently and permanently equipped multiple spindle drill heads, or so-called cluster-boxes, of various sizes and shapes readily may be secured upon the translatable head of a conventional type of drilling machine. Thus the machine so equipped will have all of the advantages of a universally adjustable multiple spindle drilling machine without having any of the disadvantages thereof. Likewise, it will embody all of the advantages of a "single purpose" machine.

The provision of multiple spindle drill heads, or cluster boxes, for attachment to single spindle drilling machines is not new, many devices heretofore having been provided for this purpose. The prior devices, however, have been designed to fit a selected drilling machine and frequently is it necessary to design and build special equipment for the selected machine to render it adaptable for drill head use. These devices therefore have not been interchangeable on a given machine nor could they be taken from one machine and readily be applied to another in the event of a break-down of the machine.

This invention contemplates forming one end of the translatable heads of each of a whole series of drilling machines with uniform seats for the reception of any one of a plurality of adapter plates each formed with one face complemental to the seats on the heads and the other face adapted to be fitted to a selected cluster-box; each of the cluster-boxes being provided with a projecting stub shaft of uniform shape and size, adapted to be inserted into a uniform socket in the driving spindle of any one of the drilling machines.

The stub shafts of the individual multiple drill heads are operatively connected to each of the spindles carried by said head, which spindles are arranged in accordance with the specific location of the holes to be drilled in the work pieces.

By means of this construction any one of the adapter plates, and its attached head, readily may be secured to the translatable head of any one of the drilling machines of that particular series and operated from the main driving spindle thereof.

It is to be understood that adapter plates, of various sizes and shapes, each having one face complemental to the seat on the translatable heads, will be provided by the builder of the drilling machine and that a user readily may attach a suitable one of the adapter plates to any available multiple drill head, and thereafter attach the adapter plate and the head carried thereby to any one of the machines of the series.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a side elevation of a drilling machine embodying the present invention. Figs. 2 and 3 are detail views, on a smaller scale, of the upper portion of the drilling machine illustrated in Fig. 1, showing multiple spindle drill heads of different size and different spindle arrangement secured to the translatable head thereof. Fig. 4 is a diagrammatic view showing in full, dotted and dot-dash lines three forms and sizes of adapted plates each constructed to fit upon, and to be secured to, the uniform seat on the translatable head, and each adapted to have fitted to its opposite face an individual multiple drill head. Fig. 5 is an enlarged sectional view of the lower portion of the translatable head and the improved adapter plate secured thereto and showing one form of cluster box attached to the adapter plate. Fig. 6 is a plan of one of the adapter plates and showing, in dotted lines, the translatable head to which it is secured.

Referring more specifically to the drawings the invention is disclosed as embodied in an upright drilling machine of the sliding head type and comprising a base B, upright column C, overhanging bracket D which supports suitable spindle rotating mechanism, not shown; work support T and a translatable head H. The head H is slidingly fitted upon suitable vertically disposed guides 1 formed at one side of the column C and conventional means designated generally as X is provided for giving the head its reciprocatory movements.

Rotatably but non-translatably journaled in the head H, and having a splined connection with rotating mechanism (not shown) carried by the bracket D, is a spindle S the lower end of which extends substantially into alignment with the lower face of the head H and is formed with a central bore 2.

The lower end of the spindle S is journaled in an anti-friction bearing 3, fitted within a socket in the lower wall 4 of the head H and held against axial movement upwardly by a thrust ring 5 seated against a shoulder $5^x$. The bearing is held against axial movement downwardly by a thrust ring 6 fitted within the socket in the wall 4 and held in place by screws as 7. The thrust rings 5 and 6 are preferably of a higher grade metal than that used for the head and are provided with lubricant retaining packing rings $p$.

To enable any one of a plurality of adapter plates P to be secured to the lower end of any one of the heads H of a whole series of machines, each head is formed with an annular female pilot 8, coaxial with the spindles S and a dowel hole 9. The female pilot is preferably (but not necessarily) formed in the thrust ring 6, and a wear bushing 10 is fitted within the dowel hole. It is to be understood that in each of the whole series of drilling machines the size and location of the female pilots and the dowel holes are identical, therefore any adapter plate which may be fitted to one head likewise may be fitted to any other head of the series.

Each of the improved adapter plates (regardless of its size and shape) is designed to serve as an intermediate attaching member between one of a plurality of cluster boxes (of unlike shapes and sizes) and any one of the translatable heads H. Each plate is provided at one face with a male pilot 11 adapted to fit snugly into the female pilot 8 and a dowel pin 12 adapted to enter the bore of the dowel bushing 10. The adapter plates are also each provided with a uniform series of tapped holes 13 adapted to receive the threaded ends of bolts 14 projecting through a similarly arranged set of holes extending through a flange 15 formed at the lower end of the heads H. The bolts 14 serve to draw the upper face of the adapter plate firmly into contact with the lower face of the head H. The size and shape of each of the adapter plates and the design of its lower face is determined by the specific multiple spindle head to which it is to be attached. Preferably each multiple spindle drill head, designated generally as M, is formed with a flat upper face 16 from which projects a male pilot 17 of the same shape and size and in axial alignment with the pilot 11. When the drill head is thus formed the adapter plate is formed with a flat surface 18, complemental to the surface 16, and a female pilot 19 adapted to receive the male pilot 17. Screws 20, having their heads embedded in the adapter plate, project therethrough and are threaded into tapped holes 21 formed in a part of the heads M.

It is to be remembered that the size and shape of the adapter plate and the design of its lower face is determined by its specific multiple spindle drill head and that when once attached thereto usually is not again removed therefrom.

The upper face of each of the adapter plates however is complemental to the lower end of all of the translatable heads H whereby any one of the adapter plates, and its attached drill head, may be fitted to any one of the translatable heads.

The specific construction of the multiple spindle heads forms no part of this invention and therefore detailed description thereof is deemed unnecessary. Suffice it to state that each drill head is provided with a projecting stub shaft 22 adapted to fit within the bore 2 of the spindles S and held to rotate therewith by a key 23. The stub shaft may have secured to it, within the head M, a suitable driving gear operatively connected to pinions carried by each of the auxiliary spindles t.

As hereinbefore stated the number and arrangement of the spindles t is dependent upon the nature of the work to be drilled.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A machine tool combining a frame providing spaced guides; a head translatably mounted on said guides, said head having a substantially flat face perpendicular to said guides; means to translate said head; a rotating driving spindle journaled in said head and terminating adjacent one end thereof; a cluster box of a size and shape different from the size and shape of the lower end of said head and providing a stub shaft, adapted to be secured to said translatable head with said shaft in driving relation with said driving spindle; a substantially flat adapter plate having one face secured to said cluster box and its opposite face formed complemental to the face of said translatable head; and means to secure said adapter plate to said translatable head.

2. A machine tool combining a frame providing spaced guides; a head translatably mounted on said guides, said head having a substantially flat face perpendicular to said guides and being provided with a pilot; means to translate said head; a rotating driving spindle journaled in said head and terminating adjacent one end thereof; a multiple spindle head providing a stub shaft, adapted to be operatively connected with said driving spindle to be rotated thereby, and a plurality of tool spindles operatively connected with the stub shaft; an adapter plate having one face secured to said multiple spindle head and provided at its opposite face with a pilot complemental to the pilot provided by the translatable head; a dowel connection between the adapter plate and the translatable head, said connection comprising a dowel pin in one element and a complemental dowel hole in the other; and means to secure said adapter plate to said translatable head.

3. A machine tool combining a translatable head formed at one end with a substantially flat face, a series of bolt holes and a dowel hole; a ring of high grade metal fitted into and secured to said head, said ring affording a pilot; a rotating driving spindle journaled in said head and terminating adjacent said face; an adapter plate having one face complemental to the flat face of said head and provided at said face with a pilot and a dowel pin adapted to fit the pilot of the translatable head and the dowel hole thereof, respectively, said adapter plate also being provided with a series of tapped holes arranged similarly to and in alignment with the series of bolt holes in said translatable head, bolts extending through the holes in the head and threaded into the holes in the adapter plate; and means to secure to said adapter plate a multiple spindle head having a stub shaft adapted to be operatively connected with said driving spindle.

4. A machine tool combining an upright column affording vertical guideways; a head translatably mounted on said guideways and having a substantially flat face; an anti-friction bearing secured in one end of said head; a retaining plate for said bearing secured to said head, said retaining plate being provided with an annular female pilot; a rotating driving spindle carried by said head and journaled in said bearing; an adapter plate fitted to the flat face of said translatable head and provided at one face with a male pilot complemental to said female pilot, dowel means between said adapter plate and said head accurately to locate the former on the latter; means securing said adapter plate to said head; and a multiple spindle head secured to the other face of said adapter plate, said multiple spindle head being provided with a spindle-rotating stub shaft adapted to be operatively connected with said driving spindle.

In witness whereof, I hereunto subscribe my name.

HARRY W. BOCKHOFF.